United States Patent
Atkinson

(10) Patent No.: US 11,190,420 B2
(45) Date of Patent: Nov. 30, 2021

(54) GENERATING EVENTS FROM HOST BASED LOGGING FOR CONSUMPTION BY A NETWORK LOGGING HOST

(71) Applicant: salesforce.com, inc., San Francisco, CA (US)

(72) Inventor: Jeffery S. Atkinson, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 288 days.

(21) Appl. No.: 16/176,750

(22) Filed: Oct. 31, 2018

(65) Prior Publication Data

US 2020/0136938 A1    Apr. 30, 2020

(51) Int. Cl.
| | |
|---|---|
| *H04L 12/26* | (2006.01) |
| *H04L 29/06* | (2006.01) |
| *H04L 29/08* | (2006.01) |
| *H04L 9/32* | (2006.01) |
| *H04L 9/30* | (2006.01) |

(52) U.S. Cl.
CPC ............ *H04L 43/04* (2013.01); *H04L 9/3066* (2013.01); *H04L 9/3236* (2013.01); *H04L 43/12* (2013.01); *H04L 63/0428* (2013.01); *H04L 63/101* (2013.01); *H04L 67/303* (2013.01)

(58) Field of Classification Search
CPC ..... H04L 43/04; H04L 43/12; H04L 63/0428; H04L 9/3236; H04L 9/3066
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |

(Continued)

OTHER PUBLICATIONS

Husak et al; HTTPS traffic analysis and client identification using passive SSL/TLS fingerprinting (Year: 2016).*

(Continued)

*Primary Examiner* — Dhairya A Patel
*Assistant Examiner* — Clifton Houston
(74) *Attorney, Agent, or Firm* — Schwabe Williamson & Wyatt

(57) ABSTRACT

In an example, a network traffic analysis system including a network based logging host may include a transport module, an event parser, and one or more consumer modules. The transport module may collect one or more messages including one or more event logs from one or more remote hosts, respectively. The event parser may generate normalized events consumable by the network logging host from the collected messages. The consumer modules may host process metadata of the event out to file for analysis. Other embodiments may be disclosed and/or claimed.

20 Claims, 11 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,688,823 B1 * | 4/2014 | Christensen ......... G06F 21/552 709/224 |
| 10,135,847 B2 | 11/2018 | Althouse et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |

(56) References Cited

U.S. PATENT DOCUMENTS

| | | | |
|---|---|---|---|
| 2005/0091098 A1 | 4/2005 | Brodersen et al. | |
| 2007/0043703 A1* | 2/2007 | Bhattacharya | G06F 16/24 |
| 2007/0055752 A1* | 3/2007 | Wiegand | H04L 67/14 |
| | | | 709/220 |
| 2007/0083813 A1* | 4/2007 | Lui | G06F 11/3636 |
| | | | 715/709 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2011/0218958 A1 | 9/2011 | Warshavsky | |
| 2011/0247051 A1 | 10/2011 | Bulumulla | |
| 2012/0042218 A1 | 2/2012 | Cinarkaya | |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0101301 A1* | 4/2014 | Wanser | H04L 41/085 |
| | | | 709/224 |
| 2014/0136690 A1* | 5/2014 | Jain | H04L 41/5012 |
| | | | 709/224 |
| 2014/0359537 A1 | 12/2014 | Jackobson et al. | |
| 2014/0379946 A1* | 12/2014 | Zhang | G06F 3/038 |
| | | | 710/67 |
| 2015/0156077 A1* | 6/2015 | Gao | H04L 41/0686 |
| | | | 709/223 |
| 2016/0105814 A1* | 4/2016 | Hurst | H04L 67/10 |
| | | | 370/252 |
| 2016/0164893 A1* | 6/2016 | Levi | G06F 16/215 |
| | | | 726/23 |
| 2017/0005886 A1* | 1/2017 | Dade | H04L 43/12 |
| 2017/0063653 A1* | 3/2017 | Kieviet | H04L 67/02 |
| 2017/0090960 A1* | 3/2017 | Anderson | G06F 9/485 |
| 2018/0077037 A1* | 3/2018 | Zhang | H04L 61/2514 |
| 2020/0099527 A1 | 3/2020 | Reardon et al. | |
| 2020/0120072 A1 | 4/2020 | Althouse et al. | |

OTHER PUBLICATIONS

Paxson; Bro: a system for detecting network intruders in real-time (Year: 1999).*
Square Lemon Blog; TLS Fingerprinting, Smarter Defending & Stealthier Attacking; https://blog.squarelemon.com/tls-fingerprinting/; posted Sep. 25, 2015; 6 pages.
Kroh, Andrew; Monitoring Windows Logons with Winlogbeat; Elastic.Co. blog; https://www.elastic.co/blog/monitoring-windows-logons-with-winlogbeat; May 26, 2016; 13 pages.
Haas, Steffen; Bro-Osquery; Large-Scale Host and Network Monitoring Using Open-Source Software; Department of Computer Science, IT Security and Security Management (ISS); University of Hamburg; May 31, 2018; 22 pages.
Visualise Sysmon Logs and Detect Suspicious Device Behavior—SysmonSearch; JPCERT/CC blog; https://blog.jpcert.or.jp/2018/09/visualise-sysmon-logs-and-detect-suspicious-device-behaviour--sysmonsearch.html; Sep. 19, 2018; 5 pages.
Splunk Enterprise Getting Data in 7.1.3; Monitor Windows Event Log Data; http://docs.splunk.com/Documentation/Splunk/7.1.3/Data/MonitorWindowseventlogdata; generated Oct. 25, 2018; 27 pages.
Osquery Integration; https://www.bro.org/development/projects/osquery.html; generated Oct. 25, 2018; 2 pages.
The Bro-Osquery Project; https://github.com/bro/bro-osquery; generated Oct. 25, 2018; 2 pages.
Listing of Related Cases; Oct. 31, 2018, 1 page.

* cited by examiner

```
{'@timestamp': '2018-09-26T22:56:21.467Z',
 ...
 'event_data': {'DestinationIp': '192.168.200.1',
                'DestinationIsIpv6': 'false',
                'DestinationPort': '9000',
                'Image': 'C:\\Program Files\\Winlogbeat\\winlogbeat.exe',
                'Initiated': 'true',
                'ProcessGuid': '{7A15C4BA-86A1-5BA9-0000-0010EB163600}',
                'ProcessId': '1840',
                'Protocol': 'tcp',
                'SourceHostname': 'blocky-PC',
                'SourceIp': '192.168.200.100',
                'SourceIsIpv6': 'false',
                'SourcePort': '56745',
                'User': 'NT AUTHORITY\\SYSTEM',
                'UtcTime': '2018-09-26 22:56:16.011'},
 'event_id': 3,
 ...
 'message': 'Network connection detected:\nRuleName: \nUtcTime: 2018-09-26 22:56:16.011\nProcessGuid:
 {7A15C4BA-86A1-5BA9-0000-0010EB163600}\nProcessId: 1840\nImage: C:\\Program
 Files\\Winlogbeat\\winlogbeat.exe\nUser: NT AUTHORITY\\SYSTEM\nProtocol: tcp\nInitiated: true\nSourceIsIpv6:
 false\nSourceIp: 192.168.200.100\nSourceHostname: blocky-PC\nSourcePort: 56745\nSourcePortName:
 \nDestinationIsIpv6: false\nDestinationIp: 192.168.200.1\nDestinationHostname: \nDestinationPort:
 9000\nDestinationPortName: ',
 ...
 'user': {'domain': 'NT AUTHORITY',
          'identifier': 'S-1-5-18',
          'name': 'SYSTEM',
          'type': 'User'},
 'version': 5}
```

FIG. 3A event sysmonProcNetConn(loghost: string, proto: string, srcip: string, srcprt: string, dstip: string, dstprt: string, procId: string, procImage: string)

FIG. 3B

{hostname=DESKTOP-DR25I43, orig_h=10.0.2.15, orig_p=53023/tcp, resp_h=10.0.2.100, resp_p=443/tcp, procId=7416, procImage=C:\Program Files\Mozilla Firefox\firefox.exe}
{hostname=DESKTOP-DR25I43, orig_h=10.0.2.15, orig_p=53026/tcp, resp_h=10.0.2.100, resp_p=80/tcp, procId=340, procImage=C:\Windows\System32\svchost.exe}

FIG. 3C

[hostname=DESKTOP-DR25I43, orig_h=10.0.2.15, orig_p=53023/tcp, resp_h=10.0.2.100, resp_p=443/tcp, *ja3=2872afed8370401ec6fe92acb53e5301*, procid=7418, procImage=C:\Program Files\Mozilla Firefox\firefox.exe]
2872afed8370401ec6fe92acb53e5301

FIG. 3D

```
#fields hostname    processId    conn.orig_h    conn.orig_p    conn.resp_h    conn.resp_p
ja3    ja3s    server_name    procImage    hashes
  subject issuer blocky-PC    3212    192.168.200.100    55323    66.235.146.171    443
e40f20893a4716f0706f23824d2da8a2    0debd3853f330c574b05e0b6d882dc27
omtr2.partners.salesforce.com    C:\Program
Files\Google\Chrome\Application\chrome.exe
MD5=E394D30E021EE1A907C34581CA710AB2,SHA256=91197803390E8F761F94854A7C88
B27E731BA34E4ED46D519B8FA144F53712
CN=omtr2.partners.salesforce.com,O=Adobe Systems Incorporated,L=San
Jose,ST=California,C=US    CN=DigiCert SHA2 High Assurance Server
CA,OU=www.digicert.com,O=DigiCert Inc,C=US
```

FIG. 6

```
HASSH example:
#fields hostname    processId    conn.orig_h    conn.orig_p    conn.resp_h    conn.resp_p
success    attempts    client_string    hassh    server_string    hasshServer    procImage
hashes
#types string    string    addr    port    addr    port    bool    int    string    string    string    string
string    string
blocky-PC    4240    192.168.200.100    55389    192.168.200.122    F    1
SSH-2.0-PuTTY_Release_0.70    0425c279610910d2d9aef3b285e59b86
SSH-2.0-OpenSSH_7.4    6832f1ce43d4397c2c0a3e2f8c94334e
C:\Users\blocky\Desktop\putty.exe    -
blocky-PC    4056    192.168.200.100    55390    192.168.200.122    T    4
SSH-2.0-PuTTY_Release_0.70    0425c279610910d2d9aef3b285e59b86
SSH-2.0-OpenSSH_7.4    6832f1ce43d4397c2c0a3e2f8c94334e
C:\Users\blocky\Desktop\putty.exe    -
```

FIG. 7

GENERATING EVENTS FROM HOST BASED LOGGING FOR CONSUMPTION BY A NETWORK LOGGING HOST

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to network traffic analysis, and some embodiments relate to generating events from host based logging for consumption by a network logging host.

RELATED CASES

U.S. patent application Ser. No. 15/589,220 entitled CLIENT FINGERPRINTING FOR INFORMATION SYSTEM SECURITY, filed May 8, 2017, is incorporated by reference herein.

DESCRIPTION OF THE RELATED ART

Historically, access to information systems may be limited to authorized users or clients. An Intrusion Detection System (IDS) such as Bro (also known as Zeek) may obtain a wealth of valuable telemetry based on inspecting all traffic on a link. While this traffic inspection can detect an intrusion, an incident response to the intrusion may require more information than can be collected through link traffic analysis alone.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 3A illustrates an example of an output of any transport module described herein, such as the transport module(s) described with reference to FIG. 2.

FIG. 3B illustrates an example of an output of any event parser described herein, such as the event parser(s) described with reference to FIG. 2.

FIG. 3C illustrates an example of an output of any consumer module described herein, such as the consumer module(s) described with reference to FIG. 2.

FIG. 3D illustrates another example of an output from any consumer module described herein, such as the consumer module(s) described with reference to FIG. 2.

FIG. 6 illustrates an example of a file that may be logged out based on the operations of FIG. 5.

FIG. 7 illustrates an example of a file that may be logged out in the HASSH example.

DETAILED DESCRIPTION

Figure 1A:
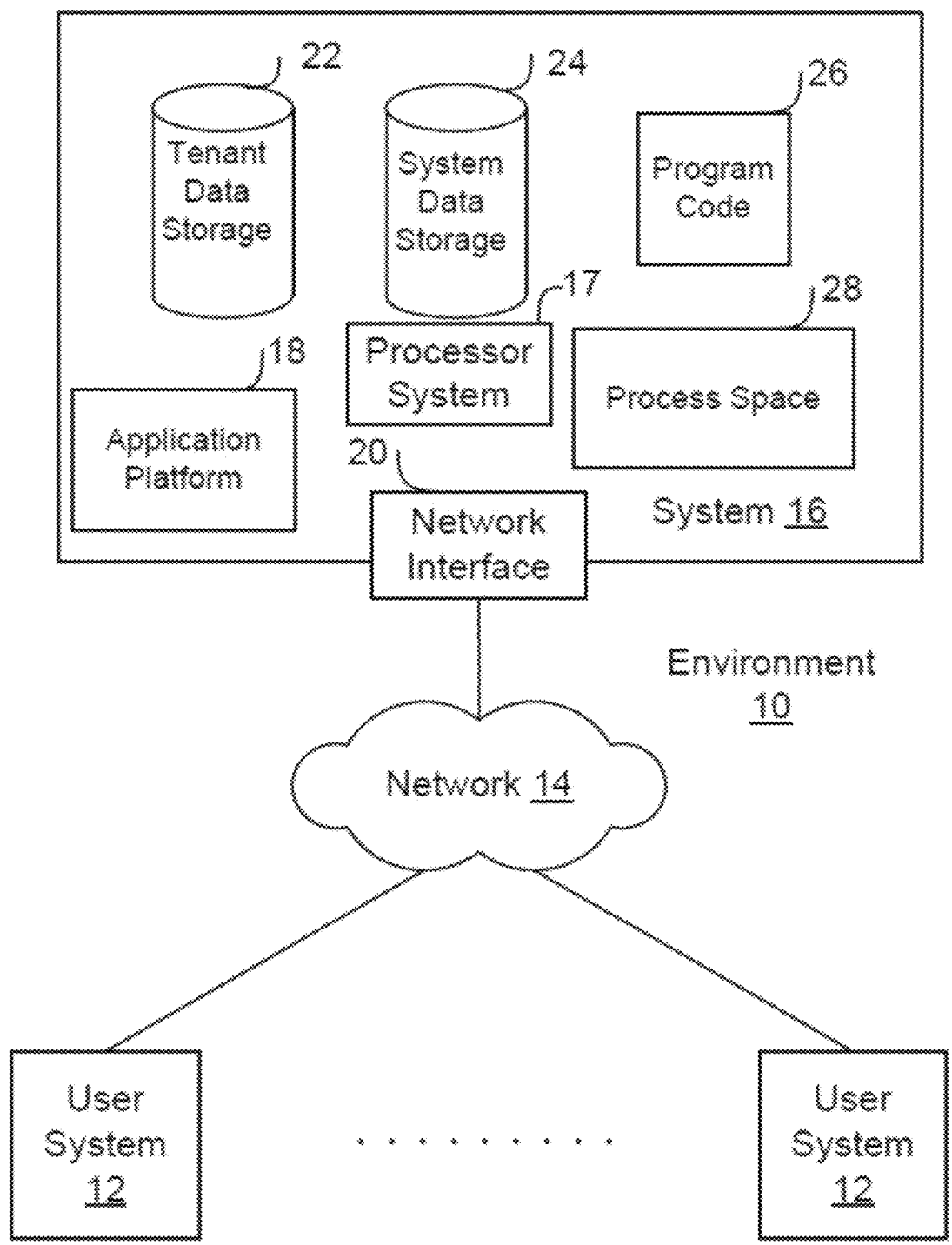
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Network based logging may include generating logs based on traffic analysis of a link. The log may record information about IP address communicating with each other, and protocols used. On the other hand, host based logging may include an operating system of the hosts themselves generating logs based on host processes. The host event log may record information about, say, opening an application (such as a browser) being opened, creating a process, loading a DLL (dynamic link library), etc.

Information available in the host from host based logging can fill gaps in information available from network based logging. For instance, network based logging may detect activity indicative of more than one host making the same type of connection to a server where one of the hosts is associated with a bad certificate. Information from host based logging may be correlated with the information from the network based logging to resolve which one of the hosts is associated with the bad certificate, which may be useful for incident response or other security reasons. However, information from host based logging may not be available to some network based logging hosts, such as Bro (e.g., Bro IDS, also known as Zeek), in at least some cases, particularly where the remote host is running a different operating system than the Bro host.

Bro is an open source network traffic analysis framework. As explained by in more detail at https://bro.org, architecturally, Bro is layered into two major components—an event engine (or core) to reduce the incoming traffic analysis packet stream into a series of higher layer events, and a script interpreter to interpret these events.

As explained at https://bro.org, events reduced from the event engine reflect network activity in policy-neutral terms, i.e., they describe what has been seen, but not why, or whether it is significant. For example, every HTTP request on the wire turns into a corresponding http_request event that carries with it the involved IP addresses and ports, the URI being requested, and the HTTP version in use. The event however does not convey any further interpretation, e.g., of whether that URI corresponds to a known malware site. Such semantics are instead derived by Bro's second main component, the script interpreter, which executes a set of event handlers written in Bro's custom scripting language. These scripts can express a site's security policy, i.e., what actions to take when the monitor detects different types of activity. More generally they can derive any desired properties and statistics from the input traffic. Bro's language comes with extensive domain-specific types and support functionality; and, may allow scripts to maintain state over time, enabling them to track and correlate the evolution of what they observe across connection and host boundaries. Bro scripts can generate real-time alerts and also execute arbitrary external programs on demand, e.g., to trigger an active response to an attack.

The OSquery-extension for Bro adds a Bro interface to OSquery. As explained in more detail at https://devhub.io/repos/bro-bro-osquery, this may enable Bro to subscribe to changes from some hosts as a continuous stream of events that conceptually resemble the events that Bro's engine reduces from network traffic. This extension is controlled from Bro scripts, which send SQL-style queries to the hosts and begin listening for any updates coming back. However, the SQL-style queries on which this extension relies may not return updates from some hosts, such as hosts running the Windows® operating system.

Platforms for Windows® host event log analysis are known. Some of these platforms may centralize logging into a search platform to permit analysis, but these platforms may not integrate with some network based logging hosts such as a Bro host.

One embodiment described herein includes a transport module, an event parser, and one or more consumer modules (e.g., Bro scripts) to collect event logs from one or more hosts (e.g., Windows® hosts) remote from the Bro host. In some examples, the transport module may include a lightweight remote-host-side application such as WinLogBeat on each remote host that forward logs generated by Windows host based logging to a network traffic analysis system. The transport module may also use an application on the network traffic analysis system (e.g., remote from the Windows hosts), such as Logstash, to receive the event logs and write them out into a different (such as the JSON format—JavaScript Object Notation format).

The JSON formatted event logs may be fed to an event parser of the network traffic analysis system. In some embodiments, the event parser may be located on the Bro host (which may be a Linux machine). In other embodiments, for scaling, the event parser may be distributed over the Bro host and one or more intermediary hosts between the Bro host and the Windows hosts.

The event parser may raise events to Bro by parsing the JSON formatted event logs. The event parser may use bindings (such as Broker Python bindings) to raise the events to Bro. The event parser may be implemented as a Python script in some embodiments, and in these embodiments may be referred to as "Sysmon-Broker.py" (as it may include Python code to port in an output from "Sysmon"—a Windows event logging component—to Broker, which is an application to enable communication to Bro).

Once the host based logs are brought into the network based logging host, e.g., the Bro host, one or more consumer modules (e.g., Bro scripts) may consume the events. The consumer modules (e.g., Bro scripts) may include any logic to interpret the events.

One example of a consumer module may be a correlation module to associate network based logging metadata with host based logging metadata of the events. For instance, the correlation module may extend the generated events with values to correlate a network process identified using network traffic analysis to a host process indicated by the generated event. In one example, the values may be SSL (secure socket layer) client fingerprints. The SSL client fingerprints may be generated by a fingerprinting systems, such as any fingerprinting system described in U.S. patent application Ser. No. 15/589,220 entitled CLIENT FINGERPRINTING FOR INFORMATION SYSTEM SECURITY, filed May 8, 2017, is incorporated by reference herein. The extended events may be used by an analyst (e.g., a person) related to, say, an incident response to a network intrusion or some other security issue.

In various embodiments described herein, a transport module and an event parser may take a feed of Windows event logs, and parse information of the feed using a mapping (such as Python bindings for Broker) to generate events consumable by a network based logging host (such as Bro). The information of the feed may be parsed to generate the events using python code, so that that the events can be forwarded to the Bro IDS core.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
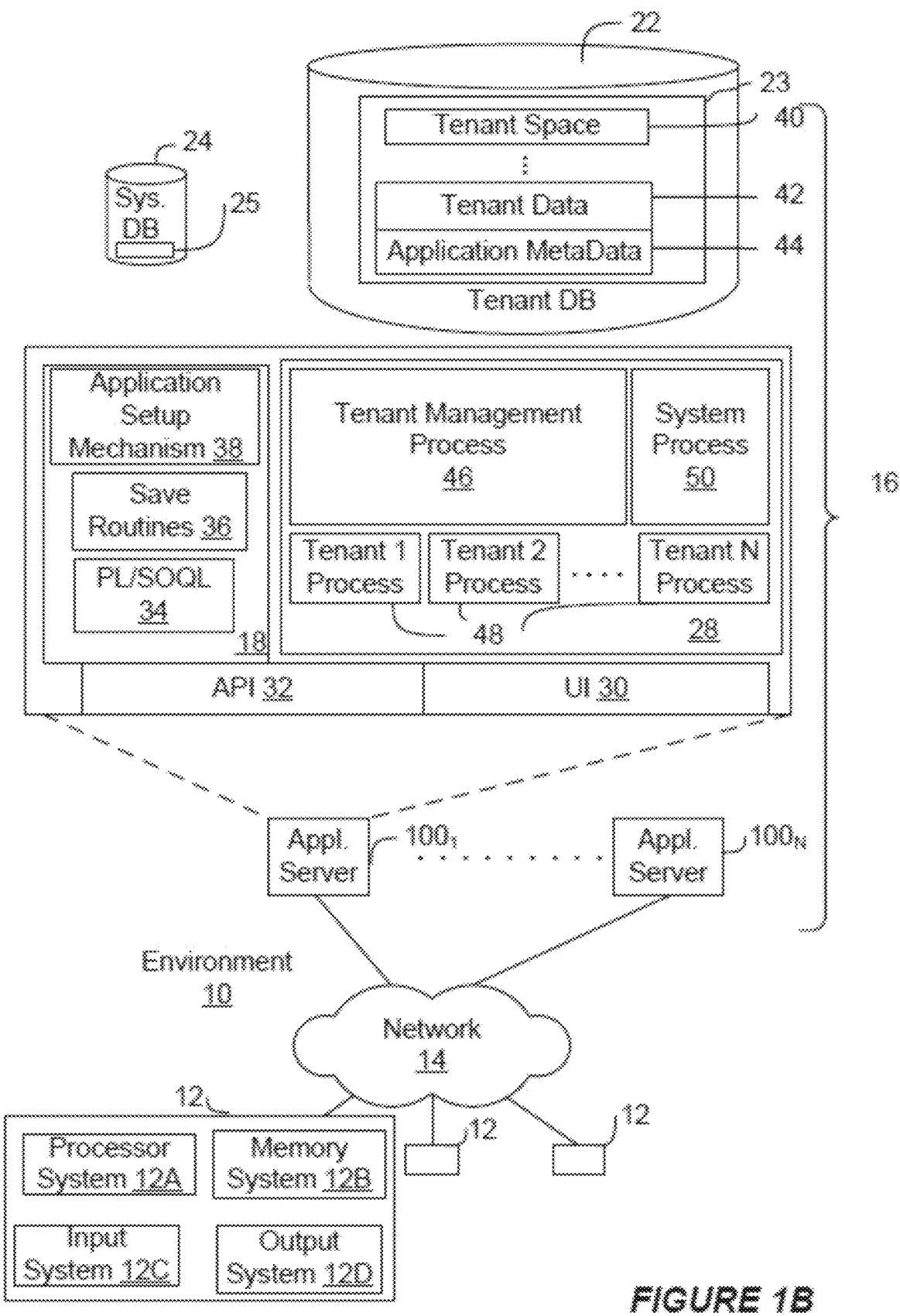
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 100₁-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 1001 can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Generating Events from Host Based Logging for Consumption by a Network Traffic Analysis Platform There is a wealth of information available in host based logs, such as Windows event logs. These logs may be readily accessed and Sysmon may provide security specific logging. Integrating these logs into Bro may require Broker. Some embodiments described herein may use Broker Python bindings to parse logs and raise events to Bro.

In one embodiment, a log transport module may send event logs from Windows Hosts to a network traffic analysis system, such as a system including a network based logging host. The log transport module may include a component such as WinLogBeat operating on each Windows Host and one or more other components operating on the network traffic analysis system (which, for scaling reasons, may include the Bro host and one or more other intermediary devices between the Bro host and the Windows hosts)

The network traffic analysis system may include one or more event parsers, which may normalize/transform the data. Again, for scaling reasons, the system may include the Bro host and one or more intermediaries that may include one or more event parsers, respectively. In some embodiments, the event parser may be a python script (e.g., Sysmon-Broker.py) to receive the event logs, parse them, and generate events. The event parser may expose the generated events to the Bro IDS core.

Access to the events by the Bro IDS core may in turn expose the event log data to consumer modules of Bro's scripting environment. These consumer modules (which may be implemented as Bro scripts) may be used to apply complex logic and/or correlate network based logging metadata with host based logging metadata of the events. Of course, since the scripting environment is extensible, this environment may include any number of consumer modules, which may use the event metadata for a variety of purposes. Generally, the event parser may enable network and host processing by Bro. Many network session flows may be extended or enhanced to provide a comprehensive view of how a host actually generated the network traffic observables.

In one example, the events may be extended by network logging metadata. In one embodiment, a JA3 TLS fingerprint may be added to the host based logging metadata. This may provide an analyst (e.g., a person) the ability to attribute a process to JA3 hash to aid in incident response or analysis.

In one embodiment, a Bro script mapJA3_Proc may combine event log metadata originated by Windows hosts with network based logging metadata originating from traffic analysis, such as mapping JA3 with the process that generated the network traffic. A first process may include gather details from the Sysmon event ID 1 (e.g., Process Create) to identify the MD5 and SHA256 of the file on disk (e.g., lookup by the hostname and the Process ID (PID). A next process may be to gather details from Sysmon Event ID 3 (e.g., Network Connection). The network connection event may provide the PID along with the full path to the binary that was loaded. These details may be referenced by a connection ID (connection IDs may be made up of the source IP, source port, destination IP, and destination port). A generated event including this information may be exposed to the Bro IDS core.

Figure 2:
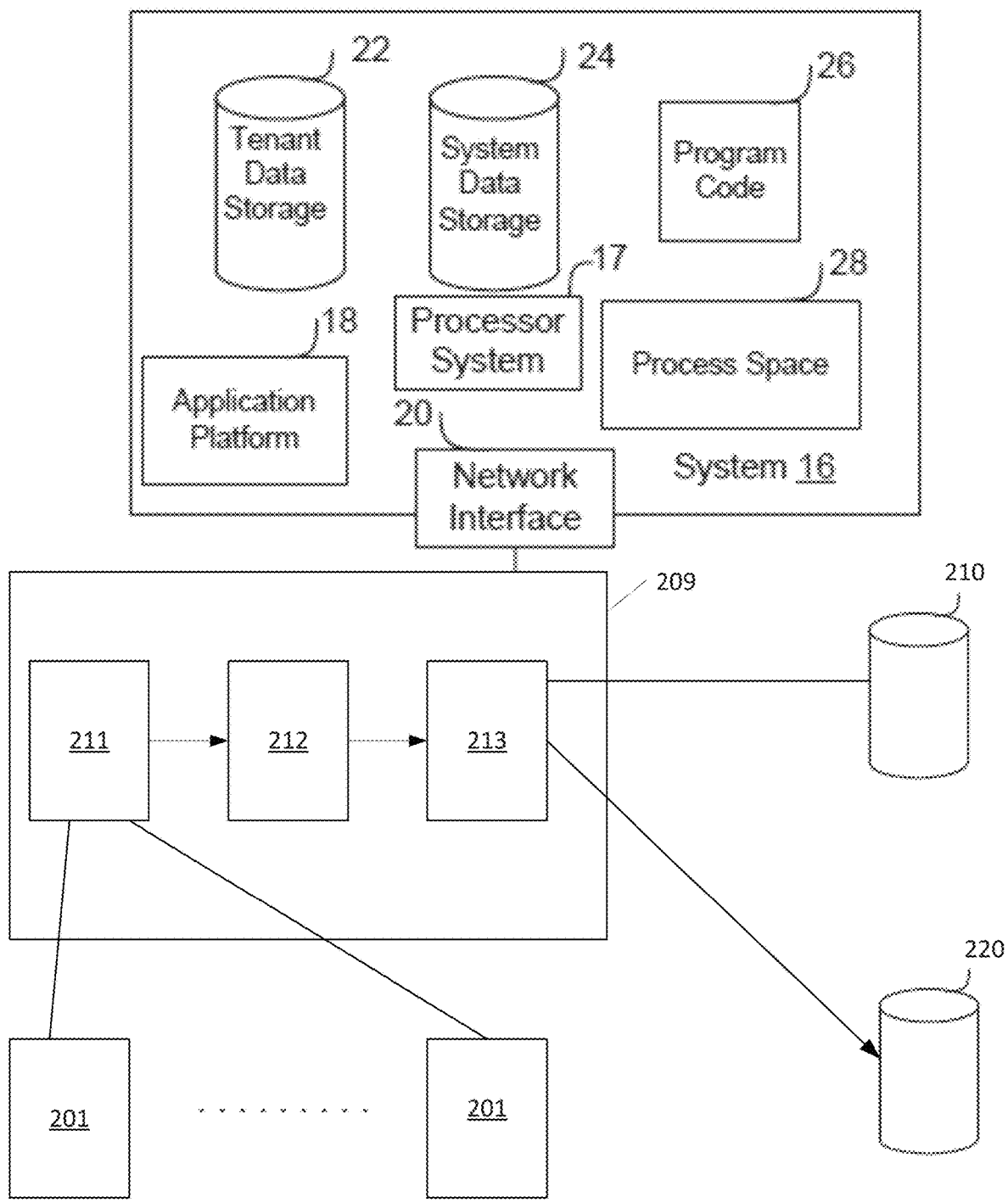
FIG. 2 shows a simplified block diagram of example implementations of a system to generate events from host based logging for consumption by a network logging host.

FIG. 2 shows a simplified block diagram of example implementations of a network traffic analysis system 209 to generate events from host based logging. Network traffic analysis system 209 may include a processing system to execute instructions stored (on a memory system) for generating events from host based logging for consumption by a network based logging host, or instructions to perform any other process described herein. Selected elements of FIGS. 1A and 1B are also shown in FIG. 2, with the reference numbers retained (database system 16 may be similar in any respects to any database system described herein, such as the database system 16 described with reference to FIGS. 1A-B). Hosts 201 may be similar to any user terminals described herein, such as the user terminals 12 described with reference to FIGS. 1A-B to communicate with the database system 16. Hosts 201 may operate different operating systems (e.g., Windows) than the network based logging host. System 209 may store information about the generated events in the database 220.

The system 209 may analyze network traffic between the database system 16 and the remote hosts 201. The system 209 may operate a network traffic analysis host (not shown) such as a Bro host. In some embodiments, the network traffic analysis host may operate a different operating system than some of the hosts 201. For example, the Bro host may be a Linux host, and the hosts 201 may be Windows hosts. In some embodiments, for scaling, the system 209 may include other devices (not shown) between the network traffic analysis host and the remote hosts 201.

The system 209 may include one or more transport modules 211 to obtain event logs from the hosts 201. The transport module(s) 211 may be distributed (not illustrated) between the network based logging host of the system 209 and the hosts 201 in some embodiments. In one embodiment, the transport module(s) 211 may include a lightweight component (e.g., Winlogbeat) located on the hosts 201, and remaining component(s) located on the network traffic analysis hosts and/or the intermediary devices (for scaling). In some embodiments, the remaining components may include Logstash.

One or more event parsers 212 may receive an output from the transport module(s) 211. The event parser(s) 212 may operate on the network based logging host, or may be distributed on the network based logging host and the intermediary devices. The event parser(s) 212 may generate events from host based logging metadata of the output of the transport module(s) 211. The event parser(s) 212 may forward the generated events to components of the network based logging host, such as a network based logging engine and/or its components (e.g., the Bro core and/or Broker).

The network based logging host may expose the events to one or more consumer module(s) 213. In some examples, one of the consumer module(s) 213 may output the event to a file, and store the file in a database 220.

In some examples, the same or another one of the consumer module(s) 213 may communicate with a database 210, which may store information derived from network traffic analysis, before outputting the file to database 220. For example, the consumer module(s) 213 may correlate a value from the database 210 to one of the events, and add the correlated value to the file before the file is stored in the database 220. In these embodiments, the files stored in the database 220 may include metadata from host based logging combined with metadata from network based logging (e.g., metadata originating from network traffic analysis, such as SSL client fingerprint or some other value). The consumer module(s) 213 may be implemented as Bro scripts or some other extension to a network traffic analysis core/engine.

In some embodiments, the values from the database 210 may include an SSL client fingerprint. In these examples, the database 210 may be similar in any respects to any fingerprint database described in U.S. patent application Ser. No. 15/589,220. The value may include a JA3 TLS fingerprint.

FIG. 3A illustrates an example of an output of any transport module described herein, such as the transport module(s) 211 described with reference to FIG. 2. This output may include a Logstash output (e.g., JSON format) generated from a host event log.

FIG. 3B illustrates an example of an output of any event parser described herein, such as the event parser(s) 212 described with reference to FIG. 2. The example event of FIG. 3B may be output from a Sysmon-Broker.py script on the Logstash JSON output illustrated in FIG. 3A.

The event parser 212 (FIG. 2) may be configured to generate normalized events consumable by a network based logging host from one or more messages collected from one or more remote hosts 201 (FIG. 2), respectively. Such an event parser 212 may be configured to perform field mapping (event logs received by the event parser may include fields based on a format such as the JSON format) to create the event. Field mapping may include classifying each message based on one of a plurality of predetermined event types (e.g., based on the event ID—the event ID is "3" in FIG. 3A), apply a rule of a plurality of predetermined rules to each event based on the classified event types to select content from the message (predetermined rules may be based on bindings of the network based logging host, e.g., Broker bindings), and extract the selected content and generate an event based on the extracted content and the rule corresponding to the classified event type.

FIG. 3C illustrates an example of an output of any consumer module described herein, such as the consumer module(s) 213 described with reference to FIG. 2. This example output is a log out file that may be generated from the event of FIG. 3B.

FIG. 3D illustrates another example of an output from any consumer module described herein, such as the consumer module(s) 213 described with reference to FIG. 2. In this example, network logging metadata is combined with the host logging metadata of the event (FIG. 3B) using the log out file (FIG. 3C). In this example, the network logging information includes the attribute "ja3=2872afed8370401ec6fe92acb53e5301" (a JA3 TLS fingerprint) and together with other attributes indicative of host processes.

Figure 4:
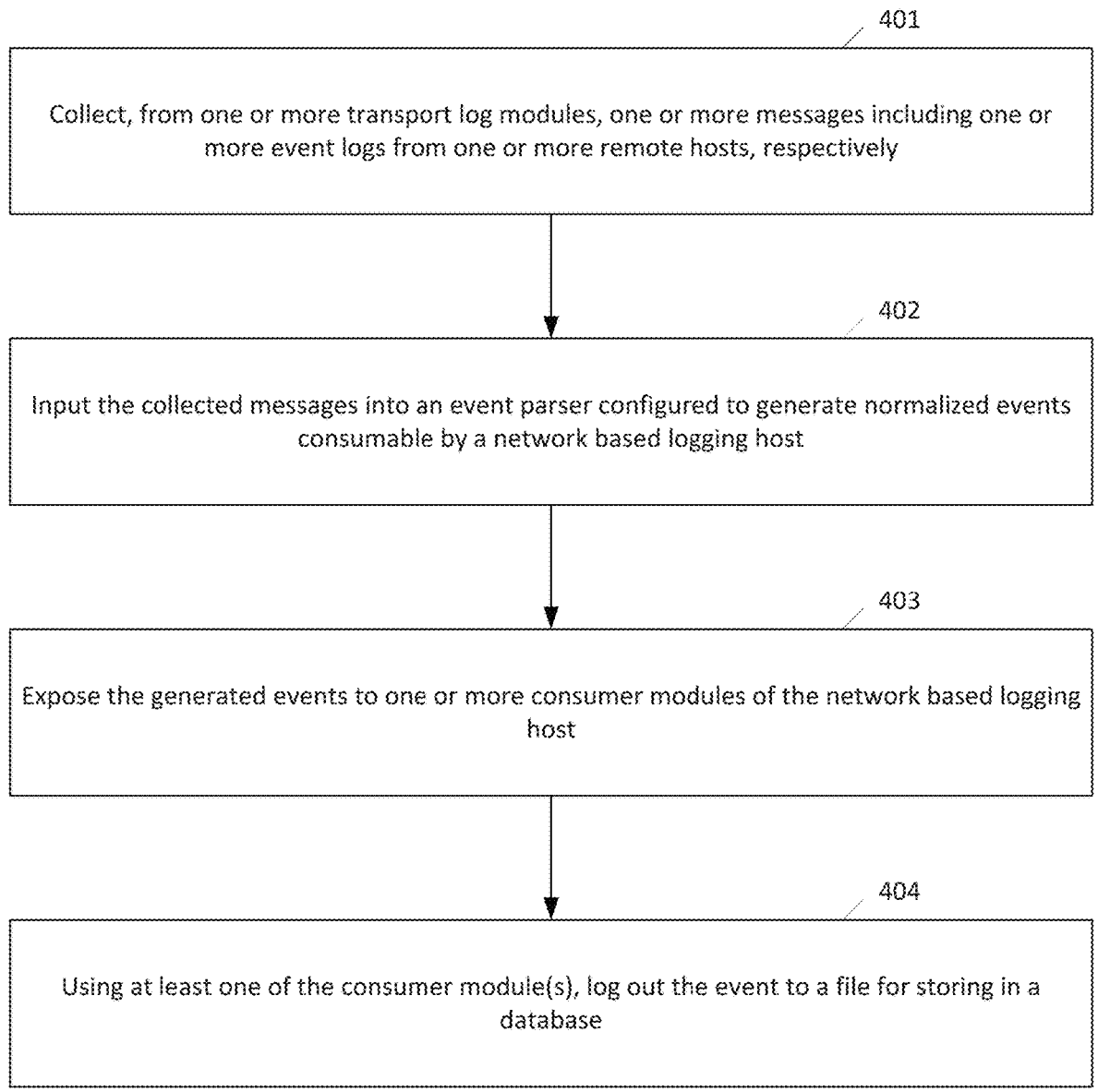
FIG. 4 illustrates operations that may be performed by the system of FIG. 2.

FIG. 4 illustrates operations that may be performed by the system 209 of FIG. 2. In block 401, the system 209 may collect, from one or more log transport modules, one or more messages including one or more host event logs from one or more remote hosts, respectively. In block 402, the system 209 may input the collected messages into an event parser configured to generate normalized events consumable by the network based logging host from the collected messages. Generating normalized events consumable by the network based logging host may include classifying each message based on one of a plurality of predetermined event types, applying a rule of a plurality of predetermined rules to each event based on the classified event types to select content from the message, and extracting the selected content and generate an event based on the extracted content.

In block 403, the system 209 may expose the generated events to one or more consumer modules of the network based logging host. In block 404, using at least one of the consumer modules, the system 209 may log out the event to a file for storing in a database.

Figure 5:
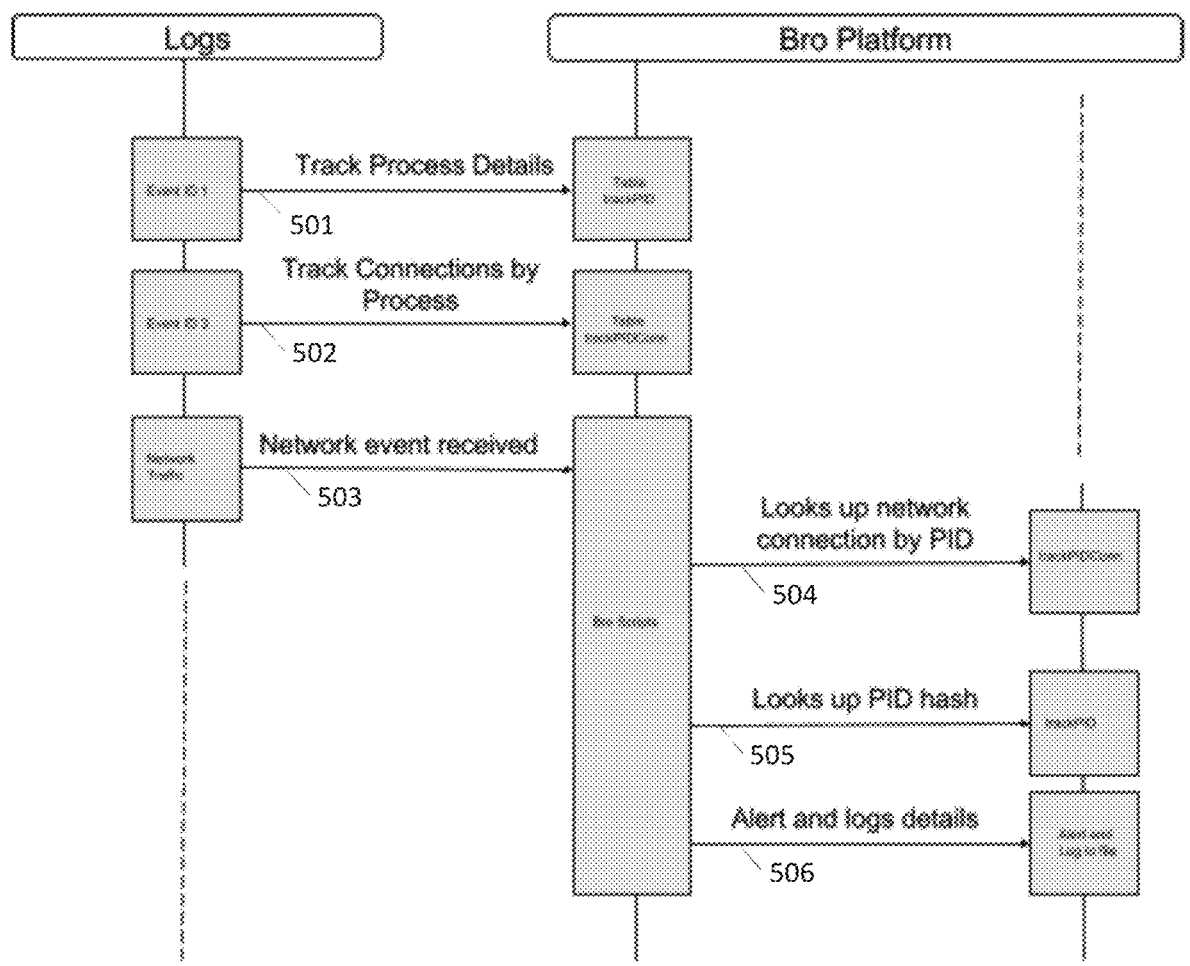
FIG. 5 illustrates operations that may be performed by the system of FIG. 2 to correlate network based logging metadata to host based logging metadata.

FIG. 5 illustrates operations that may be performed by the system 209 of FIG. 2 to correlate network based logging metadata to host based logging metadata. In process 501, the system 209 may gather the details from Sysmon event ID 1, Process Create, and add these to a first table (e.g., Table trackPID). These details may reference to a PID hash (e.g., MD5 and SHA256) of the file on the disk and may be looked up by the hostname and PID.

In process 502, the system 209 may gather the details from Sysmon Event ID 3, Network connection, and add these to a second table (e.g., Table trackPIDConn). The network connection event may provide the PID along with the full path to the binary that was loaded. These details may be referenced by a connection ID. Connection IDs may be made up of the source IP, source port, destination IP and destination port.

In process 503, the system 209 may identified a network event based on network traffic analysis. In process 504, the system 209 (e.g., a consumer module 213) may lookup connection ID from the second table based on a PID of the network event. In process 505, the system 209 (e.g., the consumer module 213) may use the looked up connection ID to lookup PID hash from the first table. In block 506, the system 209 (e.g., the consumer module 213) may log to file the looked up information from the first table together with information about the network event (and may output an alert representative of the log file event). Additional information such as JA3 and the X.509 certificate subject and issuer may be added to the file for additional context. FIG. 6 illustrates an example of a file that may be logged out based on the operations of FIG. 5.

Referring again to FIG. 5, another example consumer module 13 may use similar operations to create a mapping of HASSH fingerprints with host process information. Additional information such as client and server strings may be added to this log file for context. FIG. 7 illustrates an example of a file that may be logged out in the HASSH example.

Figure 8:
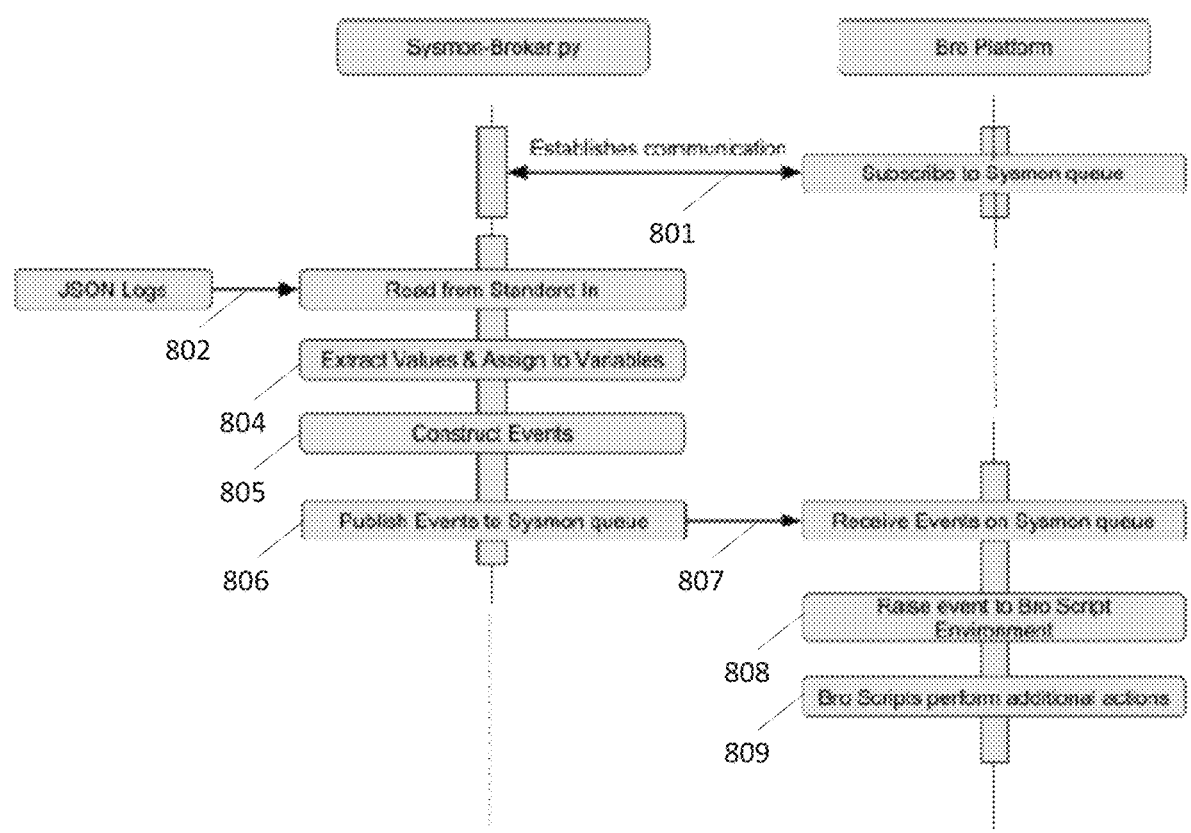
FIG. 8 illustrates operations performed by Sysmon-Broker.py and a Bro platform, according to various embodiments.

FIG. 8 illustrates operations performed by Sysmon-Broker.py and a Bro platform, according to various embodiments. Sysmon-Broker.py may be similar to any event parser described herein, such as the event parser 212 (FIG. 2). The Bro platform may be similar to any network traffic analysis system and/or network based logging host described herein.

The script Sysmon-Broker.py may be written in Python. This script may establish 801 a communication link with the Bro Platform in order to exchange events. The Sysmon-Broker.py Python script may be configured to receive 802 Windows Event Logs in JSON format from standard in. Key values are extracted and assigned 804 to variables. The script may construct 805 an event that contains the relevant 3 variables for the events and may publish 806 the events to the Bro Platform.

The Bro Platform may subscribe to the Sysmon queue and receives 807 the published events. These Bro Platform makes these events available 808 to the scripting environments for arbitrary usage. One or more Bro scripts may perform 809 additional actions on the available scripts.

EXAMPLES

Example 1 is a network traffic analysis system including a network based logging host, the system comprising: a processing system; and a memory device coupled to the processing system and including instructions stored thereon that, in response to execution by the processing system, are operable to perform operations including: collecting, using a log transport module, one or more messages including one or more host event logs from the one or more remote hosts, respectively; and inputting the collected messages into an event parser, the event parser to generate normalized events consumable by the network logging host from the collected messages, the event parser configured to: classify each message based on one of a plurality of predetermined event types; apply a rule of a plurality of predetermined rules to each event based on the classified event types to select content from the message; and extract the selected content and generate an event based on the extracted content and the corresponding rule; and exposing the generated events to one or more consumer modules of the network logging host.

Example 2 may include the subject matter of example 1 and/or any other example herein, wherein a consumer module of the one or more consumer modules is configured to extend at least one of the generated events with one or more additional values to attribute a network process identified using network traffic analysis to a host process indicated by the generated event.

Example 3 may include the subject matter of any of examples 1-2 and/or any other example herein, wherein at least one of the one or more additional values comprises an SSL (secure socket layer) client fingerprint.

Example 4 may include the subject matter of any of examples 1-3 and/or any other example herein, wherein the SSL client fingerprint is generated by a client fingerprinting system comprising a database and a client fingerprinting module.

Example 5 may include the subject matter of any of examples 1-4 and/or any other example herein, wherein an operation system of the network based logging host is different than one or more operating systems of the one or more remote hosts, respectively.

Example 6 may include the subject matter of any of examples 1-5 and/or any other example herein, wherein a consumer module of the one or more consumer modules is configured to: identify a network event based on network traffic analysis; use a process identified (PID) of the identified event to lookup a network connection from a network connection table; use the network connection to lookup a hash indicative of a host process associated with one of the one or more remote hosts from a hash table; and log out a file including information about the network event and the hash.

Example 7 is a network traffic analysis system including a network based logging platform, the network traffic analysis system comprising: a transport module configured to collect one or more messages over a network, the one or more messages including one or more host event logs from the one or more remote hosts, respectively; wherein the network based logging platform comprises one or more processors, and the network traffic analysis system further comprises: a script configured to establish a communication link with the one or more processors; the script configured to receive data from the transport module in a predetermined format, the data based on the one or more host event logs; the script configured to extract key values from the received data and assign the key values to variables; the script configured to construct one or more events using the variables and provide the one or more events over the communication link.

Example 8 may include the subject matter of example 7 and/or any other example herein, wherein the script comprises Python code.

Example 9 may include the subject matter of any of examples 7-8 and/or any other example herein, wherein the predetermined format comprises JSON (JavaScript Object Notation).

Example 10 may include the subject matter of any of examples 7-9 and/or any other example herein, wherein the host event logs originate from a first operating system of the one or more remote hosts, and wherein a second operating system of the network based logging platform is different than the first operating system.

Example 11 may include the subject matter of any of examples 7-10 and/or any other example herein, wherein the network based logging platform comprises a Linux host and the one or more remote hosts comprise one or more Windows hosts.

Example 12 may include the subject matter of any of examples 7-11 and/or any other example herein, wherein the network traffic analysis system further comprises one or more additional scripts to correlate network based logging metadata originating from the network based logging platform with host based logging metadata of the one or more events.

Example 13 may include the subject matter of any of examples 7-12 and/or any other example herein, wherein the one or more processors are configured to generate a first table to track process create events associated with the one or more host event logs, to generate a second table to track network connection events associated with the one or more host event logs; wherein an additional script of the one or more additional scripts is configured to, in response to identification of a network connection event based on inspecting network traffic of a link: lookup a PID (process identifier) for the network connection event by using the second table; lookup a hash value for the PID using the first table; and create a log file indicative of network based logging and host based logging using the hash value and information of a corresponding event of the one or more events.

Example 14 may include the subject matter of any of examples 7-13 and/or any other example herein, wherein the additional script is further to insert a JA3 or an X.509 certificate into the file.

Example 15 may include the subject matter of any of examples 7-14 and/or any other example herein, further comprising an SSL (secure socket layer) client fingerprint system including a fingerprinting database to store SSL client fingerprints generated inspecting network traffic on a link coupled to a database system.

Example 16 is a method, comprising: collecting, at a network traffic analysis system including a first network based logging host and over a network, one or more messages including one or more host event logs from the one or more second hosts, respectively; establishing a communication link with the first network based logging host; generating object notation data from data of the one or more messages; extracting key values from the object notation data and assign the key values to variables; constructing one or more events using the variables; and transmitting the one or more events over the communication link.

Example 17 may include the subject matter of example 16 and/or any other example herein, wherein object notation data is JSON (JavaScript Object Notation) formatted.

Example 18 may include the subject matter of any of examples 16-17 and/or any other example herein, further comprising logging out the one or more events to a file using the first network logging host following receipt over the communication link.

Example 19 may include the subject matter of any of examples 16-18 and/or any other example herein, further comprising: attempting to correlate a network event identified based on network traffic analysis of a link coupled to a database system with the one or more events; in response to a correlation of the network event with an event of the one or more events, logging out information of the network event and information of the event of the one or more events to a file using the first network logging host.

Example 20 may include the subject matter of any of examples 16-19 and/or any other example herein, wherein an operating system of the first network based logging host is different than an operating system of the one or more second hosts.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a database system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A network traffic analysis system including a network based logging host, wherein the network based logging host is layered into: an event engine to reduce network traffic into a stream of network events; and a script interpreter to interpret the stream of network events, the system comprising:
   a processing system; and
   a memory device coupled to the processing system and including instructions stored thereon that, in response to execution by the processing system, are operable to perform operations including:
   collecting, using a log transport module, one or more messages including one or more host event logs from one or more remote hosts, respectively; and
   inputting the collected message(s) into an event parser, the event parser to generate normalized host events consumable by the script interpreter from the collected message(s), the event parser configured to:
   classify each message based on one of a plurality of predetermined event types;
   apply a rule of a plurality of predetermined rules to each event of the host event log(s) based on its classified event type to select content from the message; and
   extract the selected content and generate an event based on the extracted content and the corresponding rule; and
   exposing the generated host event(s) to the script interpreter, wherein the script interpreter is arranged to:
   receive network events of the stream of network events directly from the event engine, wherein the stream of network events comprises a series of higher layer events reduced from an incoming packet analysis stream received by the network based logging host; and
   separately receive the generated host event(s) from the event parser, wherein the generated host events are derived from the one or more host event logs generated by the one or more remote hosts and normalized for consumption by the script interpreter.

2. The network traffic analysis system of claim 1, wherein a consumer module associated with the script interpreter is configured to extend at least one of the generated host event(s) with one or more additional values to attribute a network process identified using network traffic analysis to a host process indicated by the at least one generated host event.

3. The network traffic analysis system of claim 2, wherein at least one of the one or more additional values comprises an SSL (secure socket layer) client fingerprint.

4. The network traffic analysis system of claim 3, wherein the SSL client fingerprint is generated by a client fingerprinting system comprising a database and a client fingerprinting module.

5. The network traffic analysis system of claim 1, wherein an operating system of the network based logging host is different than one or more operating systems of the one or more remote hosts, respectively.

6. The network traffic analysis system of claim 1, wherein a consumer module associated with the script interpreter is configured to:
   identify a network event based on network traffic analysis;
   use a process identified (PID) of the identified network event to lookup a network connection from a network connection table;
   use the network connection to lookup a hash indicative of a host process associated with one of the one or more remote hosts from a hash table; and
   log out a file including information about the identified network event and the hash.

7. A network traffic analysis system including a network based logging platform and one or more processors coupled to a memory device, the network traffic analysis system comprising:
   a transport module configured to collect one or more messages over a network, the one or more messages including one or more host event logs from one or more remote hosts, respectively;
   wherein the network based logging platform is layered into: an event engine to reduce network traffic into a stream of network events; and
   a script interpreter to interpret the stream of network events, and
   the network traffic analysis system further comprises:
   a script configured to establish a communication link with the network based logging platform;
   the script configured to receive data from the transport module in a predetermined format, the data based on the one or more host event logs;
   the script configured to extract key values from the received data and assign the key values to variables;
   the script configured to construct one or more host events using the variables and expose the one or more constructed host events to the script interpreter by transmitting the one or more constructed host events over the communication link,
   the script interpreter further configured to: receive network events of the stream of network events directly from the event engine, wherein the stream of network events comprises a series of higher layer events reduced from an incoming packet analysis stream received by the network based logging host;
   and separately receive the constructed host event(s) from the event parser, wherein the constructed host event(s) are derived from the one or more host event logs generated by the one or more remote hosts and normalized for consumption by the script interpreter,
   wherein the transport module and the script are implemented by the one or more processors executing instructions stored by the memory device.

8. The network traffic analysis system of claim 7, wherein the script comprises Python code.

9. The network traffic analysis system of claim 7, wherein the predetermined format comprises JSON (JavaScript Object Notation).

10. The network traffic analysis system of claim 7, wherein the host event log(s) originate from a first operating system of the one or more remote hosts, and wherein a second operating system of the network based logging platform is different than the first operating system.

11. The network traffic analysis system of claim 7, wherein the network based logging platform comprises a Linux host and the one or more remote hosts comprise one or more Windows hosts.

12. The network traffic analysis system of claim 7, wherein the network traffic analysis system further comprises one or more additional scripts to correlate network based logging metadata originating from the network based logging platform with host based logging metadata.

13. The network traffic analysis system of claim 12, wherein the network based logging platform is configured to generate a first table to track process create events associated with the one or more host event logs, to generate a second table to track network connection events associated with the one or more host event logs;
   wherein an additional script of the one or more additional scripts is configured to, in response to identification of a network connection event based on inspecting network traffic of a link:
   lookup a PID (process identifier) for the network connection event by using the second table;
   lookup a hash value for the PID using the first table; and
   create a log file indicative of network based logging and host based logging using the hash value and information of a corresponding host event of the one or more constructed host events.

14. The network traffic analysis system of claim 13, wherein the additional script is further to insert a JA3 or an X.509 certificate into the file.

15. The network traffic analysis system of claim 7, further comprising an SSL (secure socket layer) client fingerprint system including a fingerprinting database to store SSL client fingerprints generated inspecting network traffic on a link coupled to a database system.

16. A method of operating a network traffic analysis system including a first network based logging host, wherein the network based logging host is layered into: an event engine to reduce network traffic into a stream of network events; and a script interpreter to interpret the stream of network events, the method comprising:
   collecting, at the network traffic analysis system and over a network, one or more messages including one or more host event logs from the one or more second hosts, respectively;
   establishing a communication link with the first network based logging host;
   generating object notation data from data of the one or more messages;
   extracting key values from the object notation data and assign the key values to variables;
   constructing one or more host events using the variables; and
   exposing the one or more constructed host events to the script interpreter by transmitting the one or more constructed host events over the communication link,
   wherein the script interpreter is arranged to:
   receive network events of the stream of network events directly from the event engine, wherein the stream of network events comprises a series of higher layer events reduced from an incoming packet analysis stream received by the network based logging host; and
   separately receive the generated host events from the event parser, wherein the generated host event(s) are derived from the one or more host event logs generated by the second one or more remote hosts and normalized for consumption by the script interpreter.

17. The method of claim 16, wherein object notation data is JSON (JavaScript Object Notation) formatted.

18. The method of claim 16, further comprising logging out the one or more constructed host events to a file using the first network logging host following receipt over the communication link.

19. The method of claim 16, further comprising:
- attempting to correlate a network event identified based on network traffic analysis of a link coupled to a database system with the one or more constructed host events;
- in response to a correlation of the network event with a host event of the one or more constructed host events, logging out information of the network event and information of the host event of the one or more constructed host events to a file using the first network logging host.

20. The method of claim 16, wherein an operating system of the first network based logging host is different than an operating system of the one or more second hosts.

* * * * *